United States Patent
Choe et al.

(10) Patent No.: US 8,996,067 B2
(45) Date of Patent: Mar. 31, 2015

(54) METHOD OF DISPLAYING MENU SCREEN IN MOBILE COMMUNICATION TERMINAL AND THE SYSTEM THEREOF

(75) Inventors: Gwang-Woo Choe, Daegu (KR); Jong-Sang Won, Gumi-si (KR); Ho-Jin Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 621 days.

(21) Appl. No.: 11/299,898

(22) Filed: Dec. 13, 2005

(65) Prior Publication Data

US 2006/0264244 A1   Nov. 23, 2006

(30) Foreign Application Priority Data

May 17, 2005   (KR) .................. 10-2005-0041234

(51) Int. Cl.
*H04B 1/38*   (2006.01)
*H04M 1/725*   (2006.01)
*G06F 3/0482*   (2013.01)

(52) U.S. Cl.
CPC ......... *H04M 1/72583* (2013.01); *G06F 3/0482* (2013.01)
USPC ......... 455/566; 455/575.1; 455/419; 455/461

(58) Field of Classification Search
CPC ............ G09G 5/363; G09G 5/14; G09G 5/39
USPC ........................................................ 455/566
See application file for complete search history.

(56) References Cited

U.S. PATENT DOCUMENTS

| | | | | |
|---|---|---|---|---|
| 6,333,973 | B1 * | 12/2001 | Smith et al. | 379/88.12 |
| 6,799,061 | B2 * | 9/2004 | Jeoung | 455/566 |
| 7,167,729 | B1 * | 1/2007 | Kimura | 455/566 |
| 7,889,180 | B2 | 2/2011 | Byun et al. | |
| 2001/0020957 | A1 | 9/2001 | Ringot | |
| 2005/0037814 | A1 * | 2/2005 | Yasui et al. | 455/566 |
| 2009/0037846 | A1 * | 2/2009 | Spalink et al. | 715/825 |

FOREIGN PATENT DOCUMENTS

| | | |
|---|---|---|
| CN | 1310565 A | 8/2001 |
| CN | 1556946 A | 12/2004 |
| EP | 0 949 559 A1 | 10/1999 |

(Continued)

OTHER PUBLICATIONS

Office Action dated Feb. 21, 2006 issued by the Korean Intellectual Property Office in counterpart Korean Application No. 10-2005-0041234.

*Primary Examiner* — Ajibola Akinyemi
(74) *Attorney, Agent, or Firm* — Roylance, Abrams, Berdo & Goodman, L.L.P.

(57) ABSTRACT

A system and method of displaying a menu screen in a mobile communication terminal is provided, and includes the steps of dividing a display screen into a predetermined number of areas to display a plurality of menu items in response to a user's menu screen display request, grouping the menu items based on the number of divided screen areas, and displaying the grouped menu items in the divided screen areas, respectively. Accordingly, a user can easily select various menu items of the mobile communication terminal. In addition, when the user wants to see a desired menu item, the user can easily recognize which direction a cursor should be moved, and since menu items can be exchanged group-for-group, the number of user key inputs can be minimized.

15 Claims, 5 Drawing Sheets

(56) References Cited

FOREIGN PATENT DOCUMENTS

| | | |
|---|---|---|
| EP | 1 168 780 A2 | 1/2002 |
| GB | 2 332 293 A | 6/1999 |
| JP | 2001-320466 A | 11/2001 |
| KR | 10-2002-0039742 A | 5/2002 |

\* cited by examiner

METHOD OF DISPLAYING MENU SCREEN IN MOBILE COMMUNICATION TERMINAL AND THE SYSTEM THEREOF

CROSS-REFERENCE TO RELATED APPLICATIONS

This application claims the benefit under 35 U.S.C. §119 (a) of Korean Patent Application No. 10-2005-0041234 entitled "Method of Displaying Menu Screen in Mobile Communication Terminal" filed in the Korean Intellectual Property Office on May 17, 2005, the entire disclosure of which is incorporated herein by reference.

BACKGROUND OF THE INVENTION

1. Field of the Invention

The present invention relates generally to a mobile communication terminal. More particularly, the present invention relates to a method of displaying a menu screen in a mobile communication terminal and the system thereof.

2. Description of the Related Art

Commonly, a "mobile communication terminal" refers to a device with which a user can make a call or exchange data with another party while easily carrying the device from place to place, such as a cellular phone, Personal Digital Assistant (PDA), Personal Communication Services (PCS) phone, an International Mobile Telecommunication (IMT)-2000 terminal, or a Global System for Mobile communication (GSM) terminal.

Such mobile communication terminals are being recognized as necessities, without distinction of a user's age or sex, all over the world. Accordingly, a tendency of such mobile communication terminals is toward miniaturizing, sliming, and weight reduction to enhance portability, and toward providing multimedia features with which more various functions can be pursued.

Mobile communication terminals originally introduced a phone call function, and thereafter introduced a short message service function, a memory function with which a user can store and search for telephone numbers, a lock function, an alarm function, an area number identification function, and various additional functions, such as a camera function, a digital broadcast receive function, a game function, and so on. Accordingly, the number of menu items displayed on a display screen of such a mobile communication terminal has gradually increased over time.

However, since general mobile communication terminals have relatively small-sized display screens as compared to personal computers (PCs) or PDAs having large-sized display screens, a mobile communication terminal typically displays menu items in a scroll method using direction keys. That is, the mobile communication terminal first displays a predetermined number of menu items on a display screen, and then displays remaining menu items, which have not yet been displayed on the screen, by moving a cursor using direction keys or a volume key.

Figure 1A:
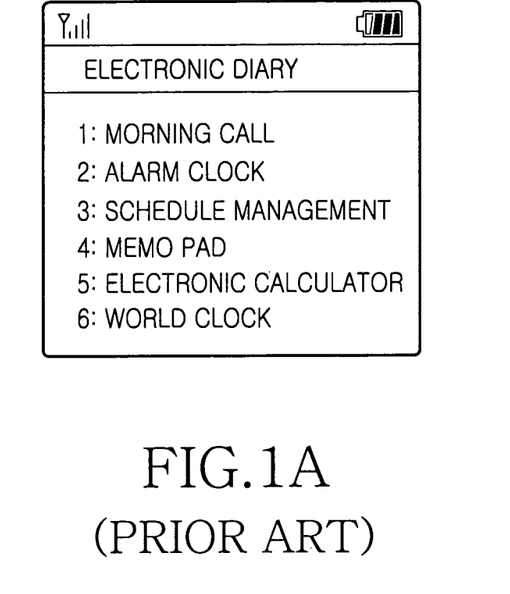
FIGS. 1A and 1B are illustrations of a conventional menu screen of a mobile communication terminal.
Figure 1B:
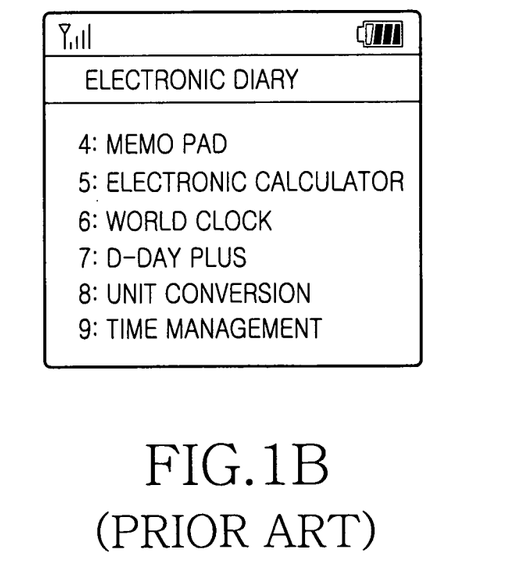

FIGS. 1A and 1B are illustrations of a conventional menu screen of a mobile communication terminal. It is assumed, for example, that there are nine total menu items related to an electronic diary function of the mobile communication terminal.

Specifically, FIG. 1A shows only six menu items, from "1. morning call" to "6. world clock", among the nine total menu items related to the electronic diary function of the mobile communication terminal.

Due to this, a user of the mobile communication terminal cannot easily determine how many menu items are related to the electronic diary function or easily determine what kind of menu items are included, through the screen of the mobile communication terminal shown in FIG. 1A. If the user wants to determine this information, the user is required to check the remaining three menu items by moving a cursor using direction keys or a volume key as shown in FIG. 1B Thus, when a user uses a mobile communication terminal having a relatively small-sized screen as compared to a PC, the user cannot easily determine what kind of menu items are included, except for those menu items displayed on a screen of the mobile communication terminal. If the user wants to select a desired menu item, the user is further required to perform more key operations.

Accordingly, a need exists for a system and method for effectively and efficiently displaying a menu screen in a mobile communication terminal and the system thereof.

SUMMARY OF THE INVENTION

An object of embodiments of the present invention is to substantially solve the above and other problems and disadvantages, and to provide at least the following advantages. Accordingly, an object of embodiments of the present invention is to provide a system and method of displaying a menu screen which a user can easily use in a mobile communication terminal.

Another object of embodiments of the present invention is to provide a system and method of displaying a menu screen in a mobile communication terminal, by which a user can easily select various menu items of the mobile communication terminal.

According to one aspect of the present invention, a method of displaying a menu screen in a mobile communication terminal is provided, the method comprising the steps of dividing a display screen into a predetermined number of areas to display a plurality of menu items in response to a user's menu screen display request, grouping the menu items based on the number of divided screen areas, and displaying the grouped menu items in the divided screen areas, respectively.

BRIEF DESCRIPTION OF THE DRAWINGS

The above and other objects, features and advantages of the present invention will become more apparent from the following detailed description when taken in conjunction with the accompanying drawings, in which.

Throughout the drawings, like reference numerals will be understood to refer to like parts, components and structures.

DETAILED DESCRIPTION OF EXEMPLARY EMBODIMENTS

Exemplary embodiments of the present invention will now be described herein below with reference to the accompanying drawings. In the drawings, the same or similar elements are denoted by the same reference numerals even though they are depicted in different drawings. In the following description, functions or constructions that are well-known to those skilled in the art are not described in detail.

Figure 2:
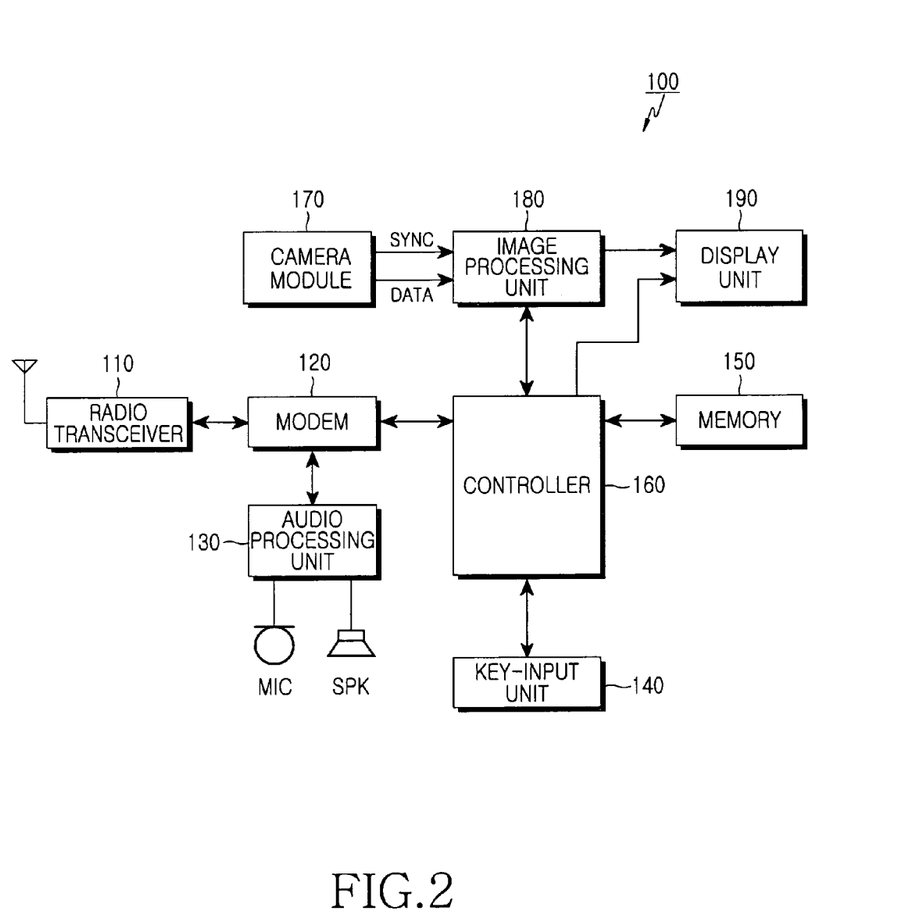
FIG. 2 is a block diagram of a mobile communication terminal according to an embodiment of the present invention.

FIG. 2 is a block diagram of a mobile communication terminal 100 according to an embodiment of the present invention.

Referring to FIG. 2, the mobile communication terminal 100 comprises a radio transceiver 110, a modem 120, an audio processing unit 130, a key-input unit 140, a memory 150, a controller 160, a camera module 170, an image processing unit 180, and a display unit 190.

The controller 160 controls the radio transceiver 110 to transmit/receive voice data, text data, image data, and control data. To do this, the radio transceiver 110 comprises a radio frequency (RF) transmitter (not shown) for upstream converting a frequency of a signal to be transmitted and amplifying the signal to be transmitted, and an RF receiver (not shown) for low noise amplifying a received signal and downstream converting the frequency of the received signal.

The modem 120 comprises a transmitter (not shown) for encoding and modulating the signal to be transmitted, and a receiver (not shown) for demodulating and decoding the received signal.

The audio processing unit 130 can comprise a codec (not shown), such as a data codec for processing packet data and an audio codec for processing audio signals such as voice.

The audio processing unit 130 converts an electrical signal received through a microphone MIC into voice data, and demodulates encoded voice data received through the radio transceiver 110 into an electrical signal and outputs the electrical signal to a speaker SPK. It is preferable that the audio processing unit 130 comprises a codec to convert a digital audio signal received through the radio transceiver 110 into an analog audio signal or convert an analog audio signal generated by the microphone into a digital audio signal. The codec comprises a data codec for processing packet data and an audio codec for processing audio signals such as voice. The codec can be included in the controller 160.

The key-input unit 140 comprises one or more character keys, number keys, direction keys, other function keys, and a separate volume key with a matrix structure (not shown), and outputs a key-input signal corresponding to a key selected by a user to the controller 160.

The memory 150 can comprise a program memory and a data memory, and can store therein various kinds of information required for an operation control of the mobile communication terminal 100 according to an embodiment of the present invention. The memory 150 can store various kinds of information selected by user selectable information (or actions), and information which the user desires to store. That is, the memory 150 comprises read only memory (ROM) for storing an operation algorithm accessed through the controller 160 for the operation of the mobile communication terminal 100, and random access memory (RAM) for storing data by control commands in a data processing process of the controller 160.

The controller 160 controls the operation of the mobile communication terminal 100 according to an embodiment of the present invention. The controller 160 divides a display screen of the display unit 190 into a predetermined number of areas (for example, three areas) to display a plurality of menu items in response to a user's menu screen display request (for example, when the user selects a menu key). Herein, it is preferable that the controller 160 divide the display screen into a main area and at least two sub areas, but the division is not limited thereto. The main area contains at least two lines for displaying menu items thereon, and each sub area contains at least a single line for displaying menu items thereon, but each are not limited thereto.

After dividing the display screen of the display unit 190, the controller 160 groups the menu items based on the number of the divided screen areas. That is, if the controller 160 divides the display screen of the display unit 190 into one main area and two sub areas, the controller 160 classifies the menu items into three groups.

The controller 160 then displays the grouped menu items on the divided screen areas, that is, the main area and the sub areas, respectively. It is preferable that the main area be located in the center of the display screen of the display unit 190, and the at least two sub areas be located above and below the main area, respectively, but the locations are not limited thereto. For example, the sub areas can be located on the left or right of the main area.

The controller 160 displays menu items of a predetermined group from among the grouped menu items on the main area of the divided screen areas, and displays the remaining menu items on the sub areas. If the number of menu items to be displayed on a sub area having a single line is too large, it is preferable that the controller 160 display the menu items in brief or in a slide form.

If a certain menu item is selected from the menu items displayed on the main area, the controller 160 displays menu items in a lower layer of the selected menu item or executes the function of the selected menu item.

If a sub area is selected based on user selectable information (for example, selection of a direction key or the volume key), the controller 160 exchanges the menu items displayed on the main area with menu items displayed on the selected sub area, and then displays the exchanged menu items.

The camera module 170 can comprise a lens module (not shown) that can be exposed or hidden, and which photographs an image. The camera module 170 also comprises a camera sensor (not shown) for converting an optical signal obtained by photographing an image into an electrical signal, and a signal processing unit (not shown) for converting the analog image signal received from the camera sensor into digital data.

Herein, it is assumed, for example, that the camera sensor is a Charge Coupled Device (CCD) sensor, and that the signal processing unit can be implemented by a digital signal processor (DSP). The camera sensor and the signal processing unit can be implemented in a single body or separately.

The image processing unit 180 generates screen data to display the digital data output from the camera module 170.

The image processing unit 180 processes the image signal output from the camera module 170 frame by frame, and outputs the frame image data by fitting it for the characteristics and size of the display unit 190. The image processing unit 180 comprises an image codec (not shown) and can thereby compress frame image data to be displayed on the display unit 190 in a set format or decompress compressed frame image data into original frame image data.

In addition, it is assumed, for example, that the image processing unit 180 has an On Screen Display (OSD) function, and therefore, the controller 160 can control the image processing unit 180 to output OSD data based on the screen size to be displayed.

The display unit 190 can comprise a Liquid Crystal Display (LCD) and can output various kinds of display data created by the mobile communication terminal 100. Herein, if the LCD is implemented using a touch screen system and method, the display unit 190 can further operate as an input module.

The display unit 190 displays the image data output from the image processing unit 180 on the screen, and displays user data output from the controller 160.

Figure 3:
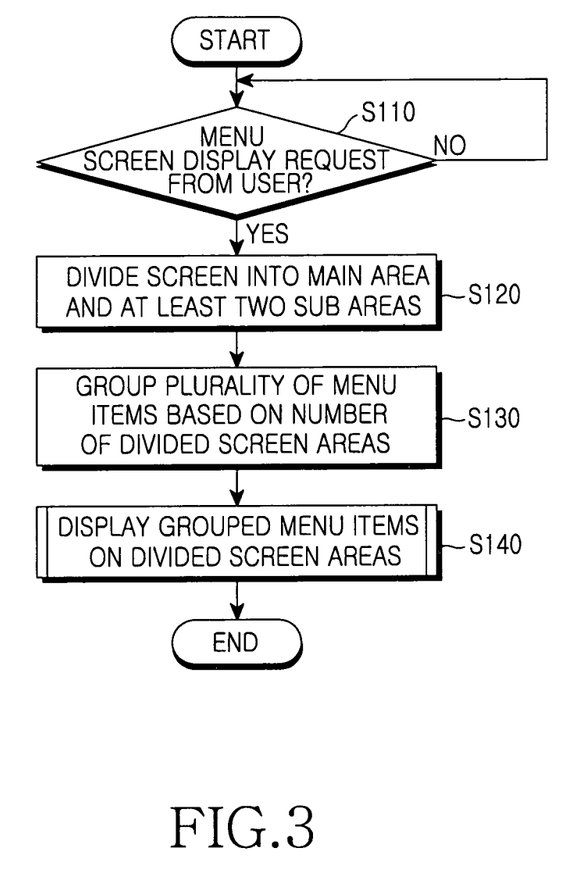
FIG. 3 is a flowchart illustrating an operation of a mobile communication terminal according to an embodiment of the present invention.

FIG. 3 is a flowchart illustrating an operation of the mobile communication terminal 100 according to an embodiment of the present invention.

Referring to FIGS. 2 and 3, in step S110, the controller 160 checks whether there is a menu screen display request from a user.

If there is a menu screen display request from the user, in step S120, the controller 160 divides the display screen of the display unit 190 into a predetermined number of areas. For example, the controller 160 can divide the display screen of the display unit 190 into a main area and at least two sub areas to display a plurality of menu items, but the division is not limited thereto. Herein it is preferable that the main area contain at least two lines to display menu items thereon, and that each sub area contain at least a single line to display menu items thereon in brief or in a slide form.

It is also preferable that the main area be located in the center of the display screen of the display unit 190, and that the at least two sub areas be located above and below the main area, respectively, but the locations are not limited thereto. For example, the sub areas can be located on the left or right of the main area.

After dividing the display screen of the display unit 190, in step S130, the controller 160 groups the menu items based on the number of the divided screen areas. That is, if the controller 160 divided the display screen of the display unit 190 into one main area and two sub areas in step S120, the controller 160 classifies the menu items into three groups.

In step S140, the controller 160 then displays the grouped menu items on the divided screen areas, that is, the main area and the sub areas, respectively.

The controller 160 displays menu items of a predetermined group from among the grouped menu items in step S140 on the main area of the display unit 190, and displays the remaining menu items on the sub areas. If the number of menu items to be displayed on a sub area having a single line is too large, the menu items can be displayed in brief or in a slide form.

If a certain menu item is selected from the menu items displayed on the main area, the controller 160 displays menu items in a lower layer of the selected menu item or executes the function of the selected menu item.

If a sub area is selected based on user selectable information (for example, using the selection of a direction key or a volume key), the controller 160 exchanges the menu items displayed on the main area with menu items displayed on the selected sub area and displays the exchanged menu items.

Figure 4:
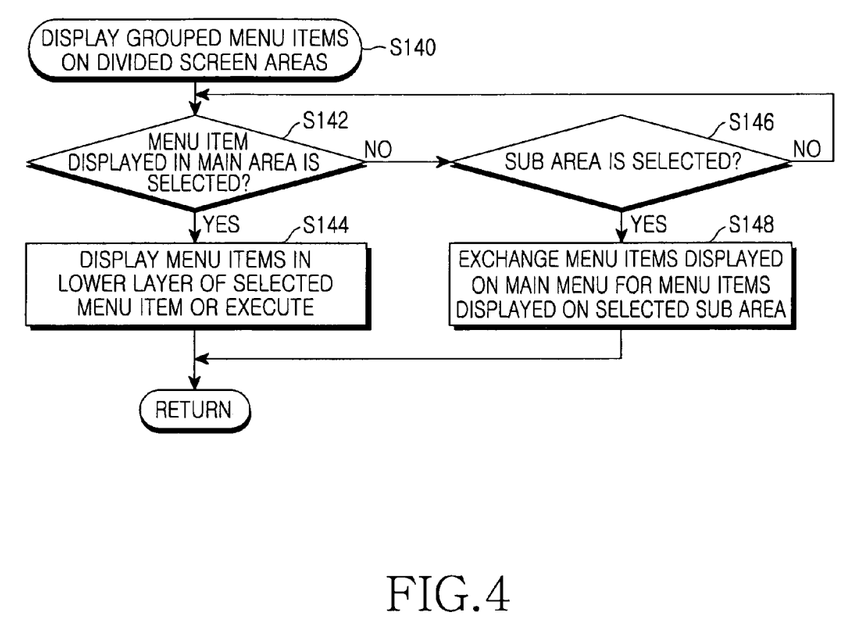
FIG. 4 is a detailed flowchart illustrating a process of displaying grouped menu items in the operation of FIG. 3.

FIG. 4 is a detailed flowchart illustrating a process of displaying the grouped menu items in the operation of FIG. 3. That is, FIG. 4 illustrates in greater detail the step S140 of displaying the grouped menu items on the divided screen areas in the operation of FIG. 3.

Referring to FIGS. 3 and 4, while displaying the grouped menu items on the divided screen areas, that is, the main area and the sub areas, respectively, in step S140 of FIG. 3, in step S142, the controller 160 checks whether a certain menu item is selected from the menu items displayed on the main area.

If a certain menu item is selected from the menu items displayed on the main area, in step S144, the controller 160 displays menu items in a lower layer of the selected menu item or executes the function of the selected menu item.

If a certain menu item is not selected from the menu items displayed on the main area based on user selectable information in step S142, in step S146, the controller 160 checks whether a predetermined sub area is selected from among the at least two sub areas. Herein, the user can select the sub area by operating a direction key or a volume key.

If the sub area is selected, in step S148, the controller 160 exchanges the menu items displayed on the main area with the menu items displayed on the selected sub area. The controller 160 can perform step S148 when the enter key is selected while in a state where the sub area has been selected, or when a cursor moves to the sub area due to the selection of a direction key.

Figure 5A:
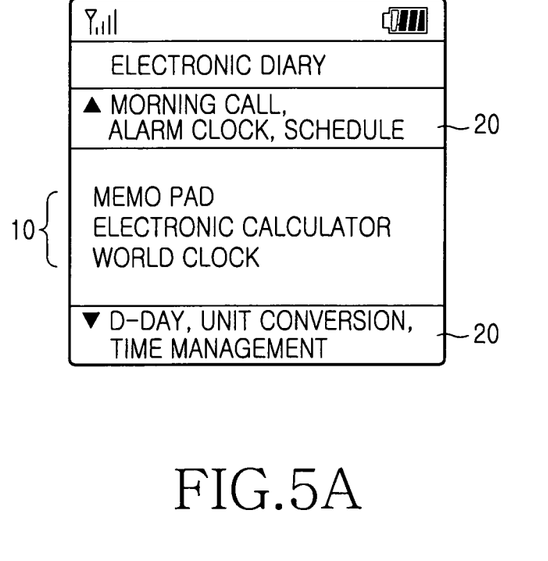
FIGS. 5A and 5B are illustrations for explaining an operation of a mobile communication terminal according to an embodiment of the present invention.
Figure 5B:
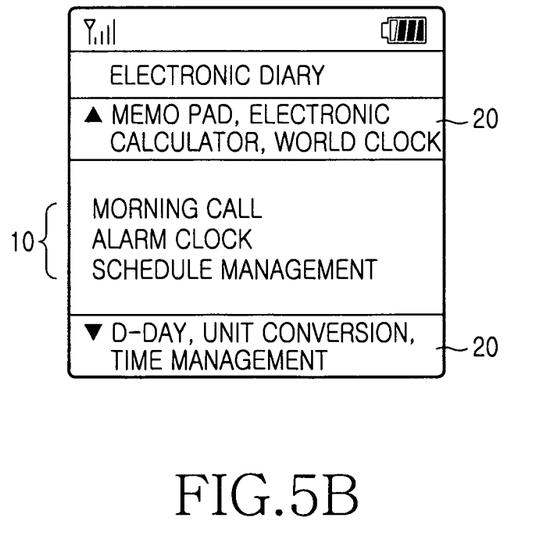

FIGS. 5A and 5B are illustrations for explaining an operation of a mobile communication terminal according to an embodiment of the present invention.

FIGS. 5A and 5B will be described with reference to FIGS. 2 through 4.

In FIGS. 5A and 5B, it is assumed, for example, that there are nine total menu items related to the electronic diary function of the mobile communication terminal, and that the display screen of the display unit 190 is divided into a main area 10 and two sub areas 20, each located above and below the main area 10, when there exists a menu screen display request from the user.

FIG. 5A shows a display screen obtained by displaying "memo pad," "electronic calculator," and "world clock" menu items included in one group on the main area 10, and displaying the remaining six menu items on the sub areas 20 after the mobile communication terminal groups the nine total menu items into three groups in response to an electronic diary menu screen request of a user. Herein the mobile communication terminal can display the menu items on the sub areas 20 in brief or in a slide form. This allows the user to easily recognize the menu items related to the electronic diary function by displaying all of the nine total menu items on the relatively small-sized screen of the mobile communication terminal.

Here, if the user selects the sub area 20 including "morning call," "alarm clock," and "schedule" menu items by operating the up-direction key or the volume-up key of the mobile communication terminal, the mobile communication terminal displays the menu items by exchanging the menu items displayed on the main area 10 ("memo pad," "electronic calculator," and "world clock") with the menu items displayed on the selected sub area 20 ("morning call," "alarm clock," and "schedule") as shown in FIG. 5B. That is, the "morning call," "alarm clock," and "schedule" menu items that have been displayed on the selected sub area 20 are displayed on the main area 10, and the "memo pad," "electronic calculator," and "world clock" menu items that have been displayed on the main area 10 are displayed on the selected sub area 20.

As described above, according to embodiments of the present invention, device convenience can be increased by providing a system and method of displaying a menu screen in a mobile communication terminal, by which a user can easily select various menu items of the mobile communication terminal.

That is, the user can easily recognize a plurality of kinds of menu items since all of the menu items can be displayed on a single screen in a mobile communication terminal having a relatively small-sized display screen as compared to a typical PC.

In addition, when the user wants to see a desired menu item, the user can easily recognize which direction a cursor should be moved, and since menu items can be exchanged group-for-group, the number of user key inputs can be minimized.

While the present invention has been shown and described with reference to certain exemplary embodiments thereof, it will be understood by those skilled in the art that various changes in form and detail may be made therein without departing from the spirit and scope of the invention as defined by the appended claims.

What is claimed is:

1. A method of displaying a menu screen in a mobile communication terminal, the method comprising:
    dividing a display screen into a predetermined number of areas including a first area and at least two second areas to display a plurality of menu items in response to a user's menu screen display request;
    grouping a plurality of groups of menu items to be displayed on the divided screen areas;
    displaying the grouped menu items of a first group on the first area and displaying the grouped menu items of a second group on the second areas;
    detecting a selection of a specific menu item of the grouped menu items of the first group on the first area;
    executing a function of the selected specific menu item; and
    detecting a selection of the second group on each of the second areas for displaying the grouped menu items of the selected second group on the first area;
    wherein the step of dividing the display screen comprises the step of dividing the display screen into a main area and at least two sub areas, wherein the first area corresponds to the main area, and at least one of the at least two second areas corresponds to one of two sub areas; and
    wherein the step of displaying the menu items comprises the step of displaying the menu items of a predetermined group among the menu items on the main area of the divided screen areas.

2. The method of claim 1, wherein the main area comprises at least two lines for displaying menu items thereon.

3. The method of claim 1, wherein each of the sub areas comprises at least a single line for displaying menu items thereon.

4. The method of claim 1, wherein the step of displaying the menu items further comprises the step of:
    if a menu item is selected from the menu items displayed on the main area, displaying menu items in a lower layer of the selected menu item.

5. The method of claim 1, wherein the step of displaying the menu items further comprises the step of displaying menu items of groups that are not displayed on the main area on the sub areas.

6. The method of claim 5, wherein in the step of displaying the menu items further comprises the step of displaying the menu items of groups that are not displayed on the main area on the sub areas in a slide form.

7. The method of claim 1, wherein the step of displaying the menu items further comprises the step of:
    if the at least one of the at least two second areas of the display screen is selected based on user selectable information, displaying menu items by exchanging the menu items displayed on the first area with the menu items displayed on the selected one of the at least two second areas.

8. A system for displaying a menu screen in a mobile communication terminal, comprising:
    a controller for dividing a display screen into a predetermined number of areas including a first area and at least two second areas to display a plurality of menu items in response to a user's menu screen display request and for grouping a plurality of groups of menu items to be displayed on the divided screen areas;
    a display unit comprising the display screen for displaying the grouped menu items of a first group in the first area and the menu items of a second group on each of the second areas by the controller; and
    a key-input unit for selecting the grouped menu items displayed on the display unit;
    wherein a selection of a specific menu item of the grouped menu items of the first group on the first area is detected;
    wherein a function of the selected specific menu item is executed;
    wherein a selection of the second group on each of the second areas for displaying the grouped menu items of the selected second group on the first area is detected;
    wherein the controller is configured to divide the display screen into a main area and at least two sub areas, and wherein the first area corresponds to the main area, and at least one of the at least two second areas corresponds to one of two sub areas; and
    wherein the display unit is configured to display the menu items of a predetermined group among the menu items on the main area of the divided screen areas.

9. The system of claim 8, wherein the main area comprises at least two lines for displaying menu items thereon.

10. The system of claim 8, wherein each of the sub areas comprises at least a single line for displaying menu items thereon.

11. The system of claim 8, wherein, if a menu item is selected from the menu items displayed on the main area, the display unit is configured to display menu items in a lower layer of the selected menu item.

12. The system of claim 8, wherein the display unit is configured to display menu items of groups that are not displayed on the main area on the sub areas.

13. The system of claim 12, wherein the display unit is configured to display the menu items of groups that are not displayed on the main area on the sub areas in a slide form.

14. The system of claim 8, wherein, if the at least one of the at least two second areas of the display screen is selected based on user selectable information, the display unit is configured to display menu items by exchanging the menu items displayed on the first area with the menu items displayed on the selected at least one of the two second areas.

15. A non-transitory computer program embodied on a computer-readable medium for displaying a menu screen in a mobile communication terminal, comprising:
    a first set of instructions for controlling a controller to divide a display screen into a predetermined number of areas including a first area and at least two second areas to display a plurality of menu items in response to a user's menu screen display request;
    a second set of instructions for controlling the controller to group a plurality of groups of menu items including at least a first group and a second group based on the number of divided screen areas; and
    a third set of instructions for controlling a display unit to display the grouped menu items of a first group in the first area and the menu items of a second group on each of the second areas; wherein a selection of a specific menu item of the grouped menu items of the first group on the first area is detected; wherein a function of the selected specific menu item is executed; wherein a selection of the second group on each of the second areas for displaying the grouped menu items of the selected second group on the first area is detected; wherein the display screen is divided into a main area and at least two sub areas, wherein the first area corresponds to the main area, and at least one of the two second areas corresponds to one of the two sub areas; and wherein the menu items of a predetermined group among the menu items on the main area of the divided screen areas are displayed.

* * * * *